(12) United States Patent
Hohenacker

(10) Patent No.: US 11,200,756 B2
(45) Date of Patent: Dec. 14, 2021

(54) METHOD FOR DETECTING PARKED VEHICLES AND BILLING PARKING CHARGES

(71) Applicant: CLEVERCITI SYSTEMS GMBH, Munich (DE)

(72) Inventor: Thomas Hohenacker, Starnberg (DE)

(73) Assignee: CLEVERCITI SYSTEMS GMBH, Munich (DE)

( * ) Notice: Subject to any disclaimer, the term of this patent is extended or adjusted under 35 U.S.C. 154(b) by 402 days.

(21) Appl. No.: 15/772,431

(22) PCT Filed: Oct. 28, 2016

(86) PCT No.: PCT/EP2016/076051
§ 371 (c)(1),
(2) Date: Apr. 30, 2018

(87) PCT Pub. No.: WO2017/072286
PCT Pub. Date: May 4, 2017

(65) Prior Publication Data
US 2018/0322710 A1   Nov. 8, 2018

(30) Foreign Application Priority Data

Oct. 30, 2015   (DE) .......................... 102015118598.9

(51) Int. Cl.
*G07B 15/02* (2011.01)
*G08G 1/14* (2006.01)
(Continued)

(52) U.S. Cl.
CPC ............ *G07B 15/02* (2013.01); *G01S 5/0036* (2013.01); *G07C 5/008* (2013.01); *G08G 1/14* (2013.01);
(Continued)

(58) Field of Classification Search
CPC ......... G07B 15/02; G01S 5/0036; G01S 5/06; G07C 5/008; G08G 1/14; G08G 1/142; G06Q 10/087
(Continued)

(56) References Cited

U.S. PATENT DOCUMENTS 4,275,398 A * 6/1981 Parker ....................... G01S 5/14
342/126
5,004,997 A * 4/1991 Shisgal .................. B60Q 9/004
340/309.16
(Continued)

FOREIGN PATENT DOCUMENTS

CN   203721041 U   7/2014
CN   104157164 A   11/2014
(Continued)

OTHER PUBLICATIONS

Kulesza, Mateusz J., "E-Park: Automated-Ticketing Parking Meter System", Apr. 2, 2015, Bachelor's thesis, Harvard College, 66 pgs. (Year: 2015).*

(Continued)

*Primary Examiner* — Shannon S Campbell
*Assistant Examiner* — Freda A Nelson
(74) *Attorney, Agent, or Firm* — Amster, Rothstein & Ebenstein LLP

(57) ABSTRACT

The invention relates to a method for detecting parked vehicles and for collecting parking fees, wherein a transponder arranged in a vehicle repeatedly emits a detection signal which is received by at least three radio devices. On the basis of the detection signal, a position of the vehicle is calculated and an identifier of the transponder is determined, wherein it is detected whether the vehicle is in a parking space area and is parked. If the vehicle uses a parking space area for parking, an identifier of the transponder is transmitted to a (Continued)

Figure 1:
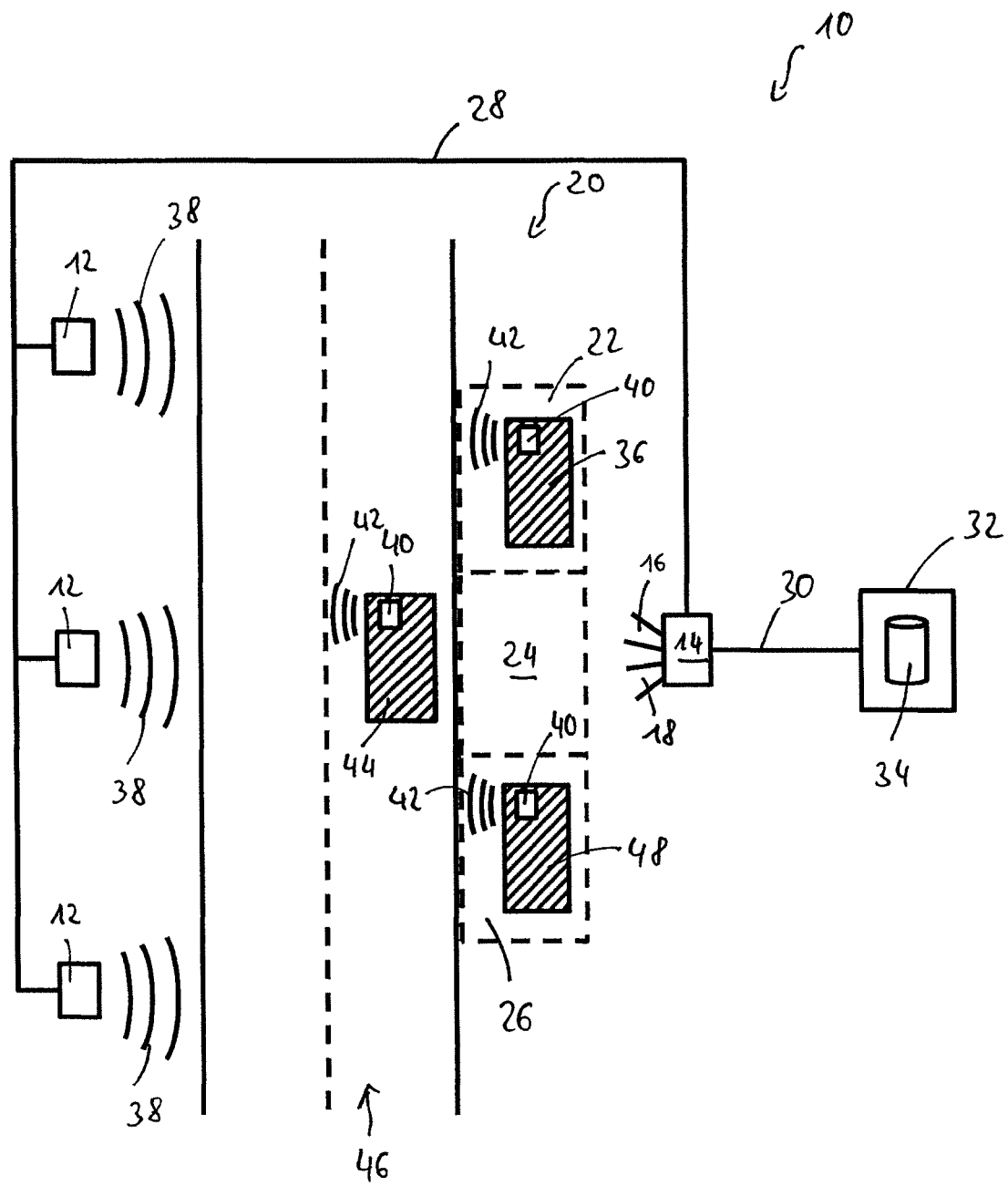

registration server which determines a parking fee on the basis of a tariff for the parking space area which is used and, if necessary, initiates a payment process.

23 Claims, 2 Drawing Sheets

(51) Int. Cl.
  *G01S 5/00* (2006.01)
  *G07C 5/00* (2006.01)
(52) U.S. Cl.
  CPC ............ *G08G 1/142* (2013.01); *G08G 1/146* (2013.01); *G08G 1/149* (2013.01); *G06Q 2240/00* (2013.01)
(58) Field of Classification Search
  USPC .............................. 705/13; 340/572.1; 701/1
  See application file for complete search history.

(56) References Cited

U.S. PATENT DOCUMENTS

| | | | | |
|---|---|---|---|---|
| 5,239,548 | A * | 8/1993 | Babbitt | G03H 1/00 359/561 |
| 5,339,000 | A * | 8/1994 | Bashan | G07C 1/30 340/932.2 |
| 5,351,187 | A * | 9/1994 | Hassett | G06K 7/0008 235/384 |
| 5,414,624 | A * | 5/1995 | Anthonyson | G06Q 30/0284 235/378 |
| 5,847,661 | A * | 12/1998 | Ricci | G08G 1/163 340/902 |
| 6,396,438 | B1 * | 5/2002 | Seal | G01S 5/10 340/8.1 |
| 7,347,368 | B1 * | 3/2008 | Gravelle | G06Q 20/20 235/380 |
| 7,619,543 | B1 * | 11/2009 | Todinca | E04H 6/426 116/173 |
| 8,339,243 | B2 * | 12/2012 | Shiau | G06K 7/10079 340/10.1 |
| 2003/0016122 | A1 * | 1/2003 | Petrick | G16H 10/60 340/10.41 |
| 2003/0122652 | A1 * | 7/2003 | Himmelstein | B60R 25/257 340/5.81 |
| 2007/0171069 | A1 * | 7/2007 | Allen | G06Q 10/087 340/572.1 |
| 2007/0247333 | A1 * | 10/2007 | Borean | G07C 1/30 340/932.2 |
| 2008/0258934 | A1 | 10/2008 | Chemali | |
| 2008/0303672 | A1 * | 12/2008 | Shigihara | B60C 23/0452 340/572.7 |
| 2009/0102721 | A1 * | 4/2009 | Chen | G08B 13/1427 342/451 |
| 2010/0017118 | A1 | 1/2010 | Dougherty | |
| 2012/0078686 | A1 * | 3/2012 | Bashani | G07B 15/00 705/13 |
| 2012/0098677 | A1 | 4/2012 | Geelen | |
| 2012/0299749 | A1 * | 11/2012 | Xiao | G08G 1/148 340/932.2 |
| 2013/0262275 | A1 * | 10/2013 | Outwater | G07B 15/02 705/27.1 |
| 2014/0172519 | A1 * | 6/2014 | Nerayoff | G06Q 20/02 705/13 |
| 2014/0210646 | A1 * | 7/2014 | Subramanya | G06K 9/00812 340/928 |
| 2014/0214499 | A1 * | 7/2014 | Hudson | G07B 15/02 705/13 |
| 2014/0333481 | A1 * | 11/2014 | Fleck | G01S 5/0268 342/463 |
| 2014/0372155 | A1 | 12/2014 | Wang et al. | |
| 2015/0179070 | A1 | 6/2015 | Sandbrook | |

FOREIGN PATENT DOCUMENTS

| | | | | |
|---|---|---|---|---|
| CN | 204360585 U | 5/2015 | | |
| CN | 104936825 A | 9/2015 | | |
| DE | 10 2007 022 461 A1 | 11/2008 | | |
| EP | 2 138 653 A2 | 12/2009 | | |
| EP | 2642461 A1 * | 9/2013 | ............ | G08G 1/149 |
| KR | 2007/0057630 A | 6/2007 | | |
| KR | 10-0778300 B1 | 11/2007 | | |
| KR | 2013 0015649 A | 2/2013 | | |
| WO | 2004/006208 A1 | 1/2004 | | |
| WO | 2015/004325 A1 | 1/2015 | | |

OTHER PUBLICATIONS

Chinese Office Action dated Oct. 10, 2020 in connection with Chinese Patent Application No. 201680077220.1.

* cited by examiner

METHOD FOR DETECTING PARKED VEHICLES AND BILLING PARKING CHARGES

This invention relates to a method for detecting parked vehicles and billing parking charges.

In modern towns and cities, parking charges are used to charge for parking periods in certain areas, for example, and thus to influence the parking period. Furthermore, parking charges are an important source of income for local authorities, wherein the charges are used to pay for improvements to infrastructure, for example.

Usually, pay-and-display machines or parking meters are installed, and drivers have to insert money so that they may park for a certain time in certain parking space. Many drivers find it inconvenient to pay at a machine or a parking meter. Moreover, manual controls, by traffic wardens for example, are necessary to check that parking charges are paid correctly. Such measures are labour- and cost-intensive, with the result that there is often no comprehensive monitoring to ensure that parking charges are paid. This in turn leads to a situation in which parking charges are frequently not paid, wherein local authorities or public institutions can suffer considerable financial loss. One may assume, that in some cases between 50% and 90% of parking charges are not paid.

The problem underlying the invention is to provide a method for detecting parked vehicles and invoicing parking charges. The method should minimise the effort involved in paying parking charges while also ensuring that the charges are paid.

According to the method of the invention:
  Parking bays in a parking area are recognised and/or determined
  A transponder is arranged in a vehicle
  The transponder automatically and repeatedly transmits an identification signal
  The identification signal is received by three radio devices placed stationary at a distance to one another
  A control device calculates a position of the vehicle by means of an identification signal and identifies the transponder
  It is determined whether the vehicle is situated in one of the parking bays
  The identification signal is used to determine whether the vehicle is parked
  If the vehicle is parked in one of the parking bays, the identification of the transponder and the parking bay being used by the vehicle are transmitted to a registration server, wherein the registration server determines a parking charge on the basis of a tariff for the parking bay being used and wherein, if necessary, the registration server initiates a payment procedure.

According to the invention, there is provided a transponder in a vehicle. Its position is determined by means of an identification signal. An identification signal can also be understood as several signals at intervals, which are periodically emitted by the transponder, for example. Once it has been determined that the vehicle in which the transponder is arranged is parked in one of the parking bays, an identification of the transponder is transmitted to a registration server, whereupon the registration server can initiate the payment procedure.

The invention makes use of the fact that transponders in vehicles enable both localisation and identification. The method according to the invention therefore enables the fully automatic billing of parking charges on the basis of fully automatic localisation and identification of the transponders. Automatic billing ensures that parking charges are paid, thereby avoiding loss of income due to illegal evasion of parking charges. Furthermore, operators can save on supervision staff, thereby reducing their costs.

According to the invention, the payment procedure for the parking charges is greatly simplified and requires no action by the driver. In particular, the method according to the invention does away with the need for expensive in-ground sensors for vehicle detection and barriers for controlling access to the parking area. The often considerable investment and maintenance costs for such in-ground sensors and barriers can then be saved.

The parking bays within the parking area can be determined in a one-off process, for example. Alternatively, the parking bays can also be recognised on the basis of the position of vehicles or their transponders. A parking area is an area with a number of parking bays. A parking bay may also be referred to as an individual parking space, i.e. a parking bay normally provides space for one vehicle.

The transponder arranged in the vehicle can be kept in the glove compartment or on the inside of the windscreen; it can also include a (rechargeable) battery as a source of power. The transponder can also be permanently installed in the vehicle, for example in the rear-view mirror. In this case, the transponder can be connected to the vehicle's electrical system. The transponder can be the size of a cigarette packet, a match box or a credit card; it can automatically emit the identification system. Automatic signal emission can occur at regular intervals without the need for external intervention. Alternatively, the transponder can emit the identification signal in response to an external request signal. The identification and request signals can be radio signals.

The identification signal is received by three radio devices (also known as anchors), wherein the absolute or relative position of the vehicle (i.e. the position of the transponder) is determined by means of triangulation based on run-time differences to the individual radio devices. The relative positions of the radio devices to one another can be known. Alternatively, the absolute positions, for example the GPS coordinates, of the radio devices can be known. Instead of three radio devices, 4, 5 or 6 radio devices can be used, thereby enabling high precision of localisation.

An identification code of the transponder can be contained in the identification signal, which can, for example, indicate a unique serial number of the transponder. The control device can determine the identification of the transponder on the basis of the identification code.

Once the position of the vehicle is known, a comparison with the known parking bays can determine whether the vehicle is situated in one of the parking bays, i.e. is standing in one of the bays.

Furthermore, the identification signal can be used to determine whether the vehicle is parked. This can be done by calculating the position of the vehicle a number of times on the basis of several consecutive identification signals, wherein if the position remains the same over a given duration, it is assumed that the vehicle is parked.

If it is determined that the vehicle is parked in one of the parking bays, the identification of the transponder and of the parking bay being used by the vehicle are transmitted to the registration server, wherein the registration server calculates a charge on the basis of a tariff for the parking bay being used. This means that the registration server checks what amount is due for parking in a certain parking bay and then initiates any required payment procedure. The payment procedure is not initiated if, for example, parking in the parking bay is currently free of charge.

The payment procedure can be realised by debiting an account, by credit card, by a PayPal account or by the automatic preparation and sending of a bill. Alternatively, the registration server can access a database in which credited amounts are stored and deduct the calculated parking charge from the credit for the respective transponder or the respective vehicle owner.

One positive aspect is that the payment procedure is not initiated until the vehicle leaves the parking bay, i.e. parking has ended. The parking charge due can be calculated on the basis of the parking duration. To this end, it can be determined whether the vehicle has left the parking bay, wherein the parking duration can be transmitted to the registration server.

In particular, the method according to the invention can be performed repeatedly, wherein the method is repeated for each vehicle newly arriving in the parking area, for example. Preferably, identification signals are emitted or requested almost constantly (e.g. several times per second) so that any change in the vehicle's position can be tracked. In addition, a large number of transponders or vehicles can be localised simultaneously, wherein large parking areas can also be monitored.

Advantageous refinements of the invention can be found in the description, the drawings and the dependent claims.

According to a first advantageous embodiment, the vehicle is registered as parked if it remains stationary for longer than a predetermined duration. This means that being stationary for longer than two or five minutes, for example, can be defined as parking. This excludes the possibility of a vehicle being considered as parked if, for example, it is caught in congestion and moves sporadically. In particular, the parking charge cannot be billed until the vehicle is registered as being parked.

According to a further advantageous embodiment, the registration server assigns a vehicle owner to the identification of the transponder and the tariff is calculated on the basis of the vehicle owner's personal data. This means that the vehicle owner's personal data can be stored on the registration server, wherein one specific transponder is assigned to one specific vehicle owner. The tariffs for different vehicle owners can differ on the grounds of their personal data. For example residents, rail ticker holders, the disabled, flat-rate bookers, etc. can profit from reduced tariffs. Furthermore, an emission category of the respective vehicle can be linked to the identification of the transponder, wherein a lower tariff and therefore a lower parking charge can be billed for low-emission vehicles.

Other tariff modalities can also be stored on the registration server, for example that the first 5, 15 or 30 minute of parking are free of charge. In particular, the payment procedure can be rendered unnecessary if parking is free of charge. Alternatively, the payment procedure can be executed with zero payment. Furthermore, congestion zone charges or charges for traversing a low-emission zone, for example, can also be collected along with the parking charges.

The tariff modalities can also include the crediting of money or of points, for example for cash-back or bonus schemes. Such rewarding of car park users can be used to promote park & ride car parks, for example. The money or points credited for parking on a park & ride car park can increase with the distance of the park & ride car park from the town centre. This can reduce the volume of traffic in inner cities. Moreover, the reward system can motivate drivers to keep a transponder in their vehicle.

Preferably, the tariff is determined on the basis of the time of day, the day of the week and/or the location of the parking bay being used. This allows the possibility of demanding higher tariffs during peak periods, whereas parking can cost less at night or on Sundays, for example. The billing of more complex tariff models in particular is greatly simplified by the described automatic method, as parking charges are billed and paid automatically.

According to a further advantageous embodiment, credit is assigned to the identification of the transponder. The parking charge is then deducted from the credit during the payment procedure. This enables prepaid models, wherein the credit corresponds to a previously paid amount. An address of the vehicle owner can also be assigned to the credit. Alternatively, the vehicle owner can also remain anonymous.

Preferably, the transponder can be sold for a small sum, e.g. €10, wherein the amount paid can be booked as credit. When the credit has been used up, the driver can pay to top it up again—as with a prepaid card for a mobile telephone.

According to a further advantageous embodiment, the transponder transmits the identification in an encrypted form, wherein the identification signal is generated in particular by means of an asymmetrical encryption method. This can prevent the identification signal from being intercepted, copied, and repeatedly transmitted by a third party to imitate the original transponder. This makes it more difficult to steal the identity of the transponder. Preferably, the identification signal can include a variable element, for example a time stamp, a random number or a part of the request signal, wherein the variable part is also encrypted. This can make imitation of the identification signal even more difficult.

Preferably, an alert signal is emitted if a vehicle parks outside of the parking bays. The alert signal can be emitted, for example, if double parking, parking in a fire service access zone or a similar situation is recognised. The alert signal can be emitted by the control device or by the registration server and can notify a municipal enforcement office or the police, for example.

According to a further advantageous embodiment, an analysis is performed of the occupied and vacant parking bays and data regarding vacant parking bays is transferred to a parking guidance system. If having a transponder in a vehicle is mandatory, the transponder can be used to distinguish between vacant and occupied parking bays. The number of vacant parking bays can then be transferred to a parking guidance system, wherein motorists searching for a parking space can be guided to vacant bays quickly and effectively. Alternatively, the vacant parking bays can be entered in a database that can be accessed by means of a web-based user interface or a smartphone app.

The analysis of the occupied and vacant parking bays can also include a statistical analysis by means of which forecasts can be made regarding parking bays that will become vacant at a later time (for example by means of a queue theory). Using this method, drivers who are still a long distance from their destination can be guided so that there is a high probability of their finding a vacant parking bay when they arrive.

Particularly preferably, the parking area is recorded by a monitoring system, at least on bay-by-bay basis, preferably visually by means of ultra-sound, by means of radar and/or by means of in-ground sensors, wherein vacant and occupied parking bays are detected by means of a detection unit, in particular by means of image processing, preferably on the basis of individual images. The monitoring system can include a camera system with one or more cameras that record the parking areas, thus enabling the use of image processing algorithms. Alternatively or in addition, the monitoring system can include ultrasound sensors, radar sensors and/or in-ground sensors. The additional use of a monitoring system is particularly useful if not every vehicle has a transponder. The monitoring system opens up the possibility of detecting vacant and occupied parking bays regardless of whether vehicles are carrying a transponder. It also opens up the possibility of visual verification by the monitoring system of a parking procedure recognised by means of the identification signal.

In particular, it is checked by means of the monitoring system whether a vehicle identified as being parked by means of the identification system is actually parked in the identified parking bay, wherein the identification of the transponder and of the parking bay being used by the vehicle are only transmitted to the registration server if the parking procedure was correctly identified.

The monitoring system can be designed to determine whether a vehicle is parked in a specific parking bay. However, the vehicle itself or the vehicle's number plate, for example, cannot be identified by means of the monitoring system.

According to a further advantageous embodiment, a notification signal is emitted if the monitoring system detects a vehicle in a parking bay, wherein the position or presence of the vehicle was not detected by means of the identification system. The notification signal can serve the purpose of reporting vehicles without a transponder or with a defective transponder so that parking attendants can specifically check whether a parking charge has been paid for the vehicle (e.g. by means of a conventional parking ticket).

The invention also relates to a system comprising at least one transponder, at least three radio devices placed stationary at a distance to one another, a control device and a registration server connected to the control system by means of a data link. The system according to the invention is characterised by the system being designed to perform the procedure described above.

According to an advantageous refinement of the system, the radio devices are accommodated in or on streetlamps, on facades, on road signs, in the monitoring system and/or on traffic lights. This means that the radio devices can be placed high above the ground, thus enabling good reception of the identification signals.

The radio devices can use the power supply of the streetlamp or of the traffic lights. This can reduce the effort involved in installing the equipment.

Alternatively, the radio devices or the entire system can be supplied with electric power from solar cells. To this end, each radio device can include a solar cell. The use of solar cells can enable deployment of the system in areas with poor infrastructure, e.g. in rural regions. Furthermore, solar cells reduce the effort involved in installing the system as, for example, not every radio device has to be separately connected to a power grid. Said rural regions frequently have park & ride car parks that can be monitored without large investments by using solar cells. A mobile telecommunications connection can be used as a data link to establish a data link to the registration server. Preferably, the system can be switched off at night when using solar cells, as park & ride facilities are usually only heavily frequented during the day.

In accordance with an embodiment, the system in accordance with the invention also comprises an RFID chip (radio frequency identification chip) that is arranged at or in the transponder. The RFID chip can preferably be operated exclusively passively, i.e. the energy required to operate the RFID chip (e.g. to transmit by means of the RFID chip) has to be supplied from the outside, for example by means of an electromagnetic field of an RFID reader. The RFID chip can in particular comprise a coil-like antenna arranged in a plane. A passive RFID chip does not require its own energy supply and is space-saving for this reason. The dimensions of the transponder therefore do not have to be enlarged, or only have to be minimally enlarged, for the additional reception of the RFID chip.

In addition to the passive RFID chip, the transponder can also comprise an active transmission and reception unit that is preferably coupled to a separate energy source (e.g. to a battery). The transmission and reception unit is preferably configured for the reception of the request signal and for the transmission of the identification signal.

An identifier can preferably be transmitted over a distance of e.g. a plurality of centimetres or a few metres (e.g. <10 metres) by means of the RFID chip. The RFID chip and thus also the transponder mechanically coupled to the RFID chip can be identified with reference to the identifier. The transponder can in this manner enable access also to be obtained, e.g. to a multi-storey car park that uses an entry control based on RFID technology.

The range of use of the transponder (or of a card the transponder accommodates) can be further increased by the RFID chip since two different technologies (i.e. the identification signal and the RFID chip) can be used in parallel. Not only parking procedures can thus be detected in the above-described manner by means of the identification signal. In addition, possibilities of use are also created in fields in which no identification signal is required, but rather an identification by means of RFID. Both the transponder and the RFID chip can be respectively associated with an account and/or with a credit card in order e.g. to enable a parking payment.

Preferably, the transponder includes a solar cell that supplies the transponder with power, wherein the transponder is designed to be attached to a vehicle windscreen. In principle, the solar cell can enable the transponder to be operated for an unlimited period without having to change a battery, for example. This further simplifies the payment of parking charges for a user as the transponder only has to be attached to the vehicle once, e.g. behind the windscreen, wherein the transponder then requires no further maintenance. The transponder may include an adhesive surface, for example, with which the transponder is attached to the windscreen.

Preferably, the transponder and the radio device are designed for radio communication in the frequency range of around 2.4 GHz, wherein, for example, a frequency range of 2.2 GHz to 2.6 GHz can be used. In particular, the transponder and the radio device use WLAN, Bluetooth and/or ZigBee. Preferably, the ISM band is used, which can be found in the range of 2.4 GHz.

The identification signals can be so-called "chirp" pulses with changing frequency, wherein the transmission frequency is changed from a start frequency to an end frequency during a pulse. The change in frequency enables detection of the identification signal even when there is broadband background radiation.

According to a further advantageous embodiment of the system according to the invention, a mobile device is envisaged that is designed to receive identification signals from the transponder, to transmit an identification of the transponder to the registration server and to receive information from the registration server concerning a vehicle assigned to the transponder. The mobile device can, for example, be carried by parking attendants. Using the mobile device, the identification of the transponder can be determined for a specific vehicle, wherein, by means of a return channel, the mobile device can receive information from the registration server concerning the specific vehicle assigned to the transponder. In this way, the mobile device enables a check as to whether a transponder is situated in the vehicle actually assigned to the transponder in order to prevent or penalise the passing on or multiple use of transponders in different vehicles.

Particular preference is given to a monitoring system for the visual recording of parking areas, at least of individual bays, wherein the monitoring system comprises a camera system and a detection unit that is designed to detect vacant and occupied parking bays, in particular by means of image processing, preferably using individual images. Besides identifying parked vehicles on the basis of the transponders and their identification signals, an additional check of the parking situation—as explained above—can be performed by means of the monitoring system. The monitoring system is described in more detail below.

Preferably, the detection unit of the monitoring system also includes the control device. This enables the system according to the invention to have just one single processor that analyses both the identification signals and the data provided by the monitoring system. This can reduce the cost of the system.

The detection unit or the monitoring system can also serve as a gateway and establish an internet and/or data connection between the control device and the registration server. Any existing internet connection of the monitoring system can then be better utilised.

Possible embodiments of the monitoring system are described in more detail below.

The monitoring system preferably comprises at least one street lighting installation, a camera system mounted on the street lighting installation, a detection unit, a transmission unit and a mobile display unit, wherein the camera system is designed to provide image indications of parking bays situated within the parking area and wherein the detection unit is particularly designed to
  store the geographical coordinates of parking bays in the camera system's field of view
  assign an occupancy status to each parking bay depending on the image indications; the status indicates whether a specific parking bay is vacant or occupied
  provide the respective occupancy status of at least the vacant parking bays along with the associated geographical coordinates of the transmission unit
wherein the transmission unit is preferably designed to transmit the respective occupancy status of at least the vacant parking bays along with the associated geographical coordinates to the mobile display device.

The monitoring system can include at least one of the radio devices, thereby contributing to localisation of the transponder. Furthermore, the occupancy status can be compared with the data that is available from determining a position by means of the transponder, wherein parking procedures can be verified.

The monitoring system can visually monitor the parking area by means of the camera system, wherein vacant parking bays can be dynamically identified and displayed within the parking area monitored by the camera system. In order to realise the monitoring system, at least one camera system, at least on detection unit, at least one transmission unit and/or at least one display device can all interact. The camera system can be mounted on a street lighting installation, thus bringing the advantage that no permission must be obtained for mounting the equipment from private building owners. Moreover, if necessary the power source of the street lighting installation can supply the camera system as well as the associated components with power. However, the camera system can also run on (rechargeable) batteries.

The camera system can be mounted and aligned so that it can preferably record several parking bays in a parking area. The image indications of the parking bays delivered to the detection unit by the camera system can be, for example, recorded images of all of the parking bays or only images of a group of parking bays. The occupancy status of a parking bay determined by the detection unit is then assigned to its respective geographical coordinates stored in the detection unit. These geographical coordinates are then sent to the transmission unit together with the associated occupancy status. The transmission unit, in turn, transmits this data to the display device which gives visual or acoustic information as to the geographical location of vacant parking bays.

Preferably, a web-enabled, mobile or stationary terminal can be used as a display device. Particular preference is given to a web-enabled mobile telephone (smartphone) or web-enabled on-board computer as the display device. However, a stationary computer or indicator board can also be used.

The transmission unit can supply said data to a number of display devices of different users who can each be shown where they can find vacant parking bays.

By means of the monitoring system, a large number of public parking bays, for example, can thus be recorded together with their respective occupancy status, wherein, on the basis of the data recorded, a large number of users can be informed where there are currently vacant parking bays that they can then specifically proceed to by the shortest route.

The detection unit used can be located completely within the housing of the camera system or only parts of the detection unit can be accommodated in the housing of the camera system. In the latter case, the remaining parts of the detection unit are usually near the transmission unit, in particular within a server that also contains the transmission unit. The server can be identical to the registration server, thus enabling the monitoring system and the control device to access the same server. The transmission unit can be housed spatially apart from the street lighting installation, for example in a server room, wherein the server is preferably provided wirelessly with occupancy status information or image indications or with data from a number of camera systems and/or detection units.

It is particularly preferred if most of the analysis of the image indications is performed within the detection unit accommodated in the housing of the camera as, in this case, only the data resulting from the analysis needs to be transmitted to the transmission unit or the server. The scope of this data is much smaller than that of the data or image indications supplied by the camera system, which means that only a small bandwidth is required for the transmission of this data from the detection unit to the server or transmission unit. Moreover, only such analysis data is saved or processed on the server that is non-critical in terms of data protection as, unlike image indications for example, such analysis data does not include vehicle number plates.

If, for example, camera systems are installed along a long street on various street lighting installations, it is not necessary that a dedicated detection unit communicating with the transmission unit or a server is assigned to each camera system. Instead, in this case, it makes sense if just one or a few of the detection units carry out the communication, whereas the other detection units transmit their data with a narrowband transmission system to the one or few detection units that then communicate with the transmission unit or the server.

Alternatively, the image indications are analysed exclusively within a housing of the camera system and, in particular, exclusively in the detection unit. This means that, except for the occupancy status, which for example indicates the coordinates of the vacant and occupied parking bays, no other data has to leave the housing of the camera system. To this end, the camera system and the detection unit can be positioned in a shared housing, wherein the housing of the camera system in particular forms the shared housing. The images or image indications recorded by the camera system can thus be processed and subsequently discarded within the housing. Strict data protection stipulations concerning public space can be met in this way as no image data, personal information or the like is stored or output.

Preferably, the image indications exclusively comprise individual images, i.e. still images. This means that the analysis in the detection unit can only be based on individual images. The respective occupancy status itself can be determined on the basis of just one individual image. Alternatively or additionally, differences between two individual images of the same section of the parking area (i.e. differences between two image indications) can be used to determine the occupancy status.

In particular, individual images of various parts of the parking area can be recorded one after the other. If using a camera system with a panning function, the camera system can be panned after recording an individual image and then record a different part of the parking area. If a number of cameras are used, the cameras can record an individual image one after the other and transmit it to the detection unit.

More preferably, the detection unit is designed to determine an occupancy status independently of specified parking bays, which are defined by lines on the ground, for example. This means that, in a parking area, parking bays can be identified as vacant even if the parking bays are not marked as such by lines, rectangles or the like. Vacant parking bays can therefore be detected within the entire visual range of the camera system regardless of whether the parking bays are marked as such or not.

The detection unit can also be designed to determine the size of a parking bay identified as vacant and to output this data together with the occupancy status. Based on the size, a vacant parking bay can be assigned to an appropriately dimensioned vehicle, wherein the number of vehicles that can be parked in a parking area can be increased.

According to an advantageous embodiment, the camera system is set up to set an exposure time in an essentially unlimited time range depending on the brightness in the field of view of the camera. Being able to set the exposure time over a broad time range means that it is possible to produce image indications capable of analysis even in darkness without having to depend on additional lighting (e.g. infra-red lighting). Preferably, the exposure time can be set based on the brightness in one section of the field pf view. For example, two square subsections can be specified in the field of view within which the brightness is determined.

The possibility of using essentially unlimited exposure times is a result of the recording of individual images for which the respective exposure time can be selected without limitation. This results in an advantage over video-based monitoring systems with which the maximum exposure time depends on the frame rate and is not freely selectable.

Due to longer exposure time in darkness, the number of recorded image indications per unit of time may be reduced. However, the occupancy status of parking bays does not change at very short intervals, which means that very long exposure times of several seconds are good enough for sufficiently accurate monitoring of parking bays. Preferably, a maximum exposure time of one or two seconds can be specified.

The detection unit can be designed to compensate for movement of the camera system caused by movement of the street lighting installation in relation to the parking areas. This is done by means of image processing in the image indications supplied by the camera system and ensures that the image indications are not falsified by movement of the camera system. In this way, movement of the street lighting installation, which is caused by wind for example, can be compensated by electronic image stabilisation. For this purpose, reference points can be determined, as far as possible in the centre of the image that have an unchanging position relative to the recorded parking bays. These can be traffic lights, markings on buildings or road signs, for example. Preferably, a marking can be placed on a supporting element ("lighting column") of the street lighting installation, in particular near ground level of the supporting element. This has the advantage that the position of the marking hardly changes, in strong wind for example, and can usually be easily recorded by the camera system. The image indications of the parking bays can then only be processed depending on their position in relation to the reference points or to the marking and independently of their absolute position within the image, wherein said movement of the street lighting installations can be eliminated during processing.

Additionally, an additional marking can be placed on the supporting element spaced apart from the first marking. On the basis of the shift in the relative positions of the first marking and the additional marking, a distortion of the supporting element can be determined, for example. This allows shifts in position of the camera system to be determined even more precisely.

Alternatively or in addition, the detection unit and/or the camera system can include at least an accelerometer and/or a gyroscope to record movement of the street lighting installation and of the camera system mounted thereon. By means of such components, rotation of the camera system can be recorded, as can movement along three orthogonal axes. On the basis of the measurement data provided by the accelerometer or the gyroscope, the image indications from the camera system can be processed in such a way that they are not falsified by movement of the street lighting installation.

Ultimately, there are therefore two different methods of compensating the movement of the street lighting installation, wherein the two methods can be used as alternatives or in combination. As a rule, compensation by means of image processing is used when there are good and useful reference points. If this is not the case, an accelerometer or a gyroscope can be used.

It is particularly advantageous if the camera system has an electrically controllable pan-tilt unit for moving at least one camera lens in relation to the parking area and/or a zoom lens. The entire parking area assigned to a camera system can be recorded with a high resolution by moving the pan-tilt unit and/or by setting the zoom lens. This enables periodic, precise scanning of the entire parking area, wherein a series of positions of the pan-tilt unit with associated zoom settings can be determined within the framework of an initialisation process. These positions are each taken up by a swift movement of the pan-tilt unit and by a zoom setting performed in parallel. An image is then recorded and the next position can be taken up. Previously recorded images or image indications can be processed by the detection unit while the pan-tilt unit is changing between two positions.

Particularly advantageous is the fact that, when using a pan-tilt unit, the initialisation and therefore the required alignment of the camera system can be performed electronically and remotely by trained skilled staff once the camera system has been installed on the street lighting installation, with no adjustment being required during the installation work itself.

Alternatively or in addition to the use of a pan-tilt unit, the camera system mounted on the street lighting installation can have a number of cameras that are stationary in relation to one another and with a different orientation to one another. These individual cameras then cover the parking area assigned to the respective camera system seamlessly and completely, in particular without movement of these cameras being necessary.

Distortion caused by wide-angle lenses can be largely avoided both by using a camera system with several cameras as well as by using a pan-tilt unit with adjustable zoom lens. It always makes sense to select a maximum camera angle for recording image indications that does not lead to image distortion. Alternatively however, it is also possible to carry out computer-aided image rectification if distortion occurs.

According to a preferred embodiment, the camera system includes at least two fix-positioned cameras with different orientation and whose fields of view overlap at least partially. Preferably, the marking and/or additional marking of the reference point for compensation of the camera system can be positioned in the overlapping section of the fields of view. Advantageously, the detection unit analyses only those image indications of just one camera at one point in time or during one time interval. The other camera or other cameras can be switched off at that point in time or during the time interval. The advantage here is that the power consumption of the monitoring system can be reduced. It also enables just one processor (or microprocessor), linked alternately with each camera, to be planned in the detection unit. In this way, the material costs of the monitoring system can be reduced.

It is particularly advantageous if the camera system is mounted on a cantilever arm of the street lighting installation. Usually, the light source of the street lighting installation is also mounted on such a cantilever arm, which means that one can assume with a great degree of certainty that no objects, such as trees, are situated between the cantilever arm and the area to be illuminated or recorded by the camera system. To this extent, mounting the camera system on the cantilever arm, means that, with a great degree of certainty, there are no objects in the way to restrict the field of view of the camera system.

This degree of certainty can be additionally increased if the camera system is positioned adjacent to a lighting module of the street lighting installation so that the distance between the camera system and the supporting element, for example the lighting column, is greater than the distance between the lighting module and the supporting element. The camera system is then as far away as possible from the supporting element and therefore also at a maximum distance to trees that may be near the supporting element.

The street lighting installation may be a lamp-bearing wire system installed between a number of buildings, for example. A wire bracing point can be a component of the street lighting installation, wherein the camera system can be mounted on the wire bracing point.

The detection unit can be designed to control or switch on, switch off or dim the brightness of the lighting modules in the street lighting installation depending on parameters determined from the image indications, in particular depending on brightness levels and/or detected motion. This variant is interesting in terms of energy saving aspects and is based on the understanding that relatively powerful lighting of the parking area is only necessary when it is dark and, at the same time, motion of pedestrians or cars is detected. In other cases, dimmed lighting is sufficient, but it must be enough for the camera system to detect the parking bays with sufficient resolution. For example, if the parking area is covered with snow, the lighting can be dimmed but if the parking area is covered with foliage, the lighting must be intensified. Moreover, said variants enable dimming of the lighting modules when the parking area is illuminated by car headlights.

It is particularly preferable if the detection unit is designed to control the brightness of the lighting modules of its assigned and other street lighting installations depending on parameters determined from image indications, in particular depending on brightness levels and/or detected motion. In this case, street lighting installations that are adjacent to the monitoring system and have no monitoring system themselves can also be switched on, switched off or dimmed accordingly. In this way, it is not necessary to mount a monitoring system on every street lighting installation. Instead, it is sufficient if the monitoring system is only present on some street lighting installations, which then also control the other street lighting installations.

Figure 2:
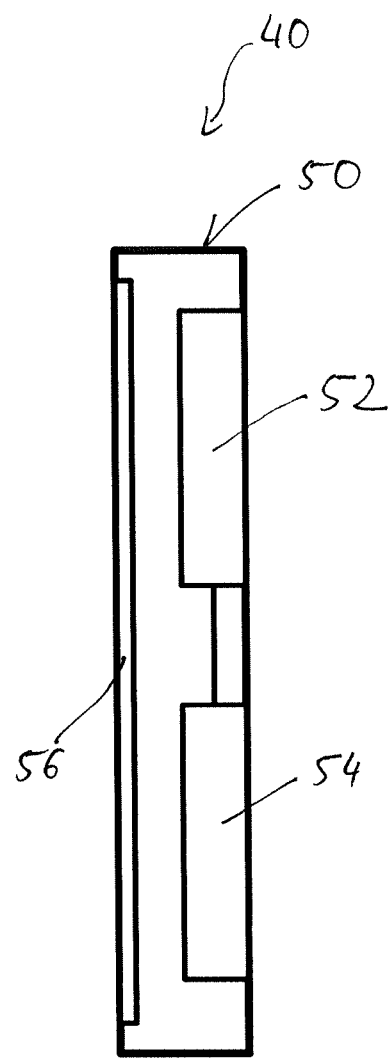

The invention will be described below solely by way of example with reference to the drawings. There are shown:

FIG. 1 a schematic view of a system for detecting parked vehicles and for billing parking charges; and FIG. 2 a schematic view of a transponder.

FIG. 1 shows a schematic view of a system 10 for detecting parked vehicles and for billing parking charges. The system 10 comprises three radio devices 12 placed stationary at a distance to one another as well as a monitoring system, of which one camera unit 14 is shown. The camera unit 14 comprises a first camera 16 and a second camera 18 whose fields of view overlap at least partially.

The camera unit 14 and the radio devices 12 monitor a parking area 20, on which there is a first parking bay 22, a second parking bay 24 and a third parking bay 26. By way of example, the following explanation refers exclusively to three parking bays 22, 24, 26, wherein the system 10 is able to monitor longer sections of road or large areas with several hundred parking bays.

The first parking bay 22 and the second parking bay 24 are generally accessible parking bays. On the other hand, the third parking bay 26 is exclusively for the disabled.

The radio devices 12 are linked to the camera unit 14 by means of a first data link 28, wherein a control device and a detection unit (neither of which are shown) are envisaged in the camera unit 14. In turn, the camera unit 14 is linked to a registration server 32 by means of a second data link 30. The registration server 32 includes a database 34.

If a first vehicle 36 approaches the parking bays 22, 24, 26 while the system 10 is in operation, request signals 38 are repeatedly emitted with the radio devices 12. The request signals 38 are answered with an identification signal 42 from a transponder 40 in the first vehicle 36. On the basis of the run-time until receipt of the identification signal 42, the position of transponder 40 is determined by means of triangulation.

As can be seen in FIG. 1, the first vehicle 36 is situated in the first parking bay 22. The position of the first vehicle 36 is determined repeatedly, for example once per second, by sending the request signals 38 again and receiving the identification signals 42 again so that it can be determined that the first vehicle 36 is situated for a longer period in the first parking bay 22.

At the same time, the camera unit 14 determines that the first vehicle 36 (or at least a vehicle of some description) is in the first parking bay 22, thereby confirming the localisation of the first vehicle 36 by means of the radio device 12.

If it is recognised that the first vehicle 36 remains for longer than two minutes in the first parking bay 22, identification of the transponder 40 or of the first vehicle 36 is transmitted to the registration server 32 via the second data link 30. The registration server 32 checks in its database 34 to which vehicle owner the vehicle 36 is assigned.

Once the registration server 32 has subsequently been informed that the first vehicle 36 has left the first parking bay 22, the parking charge is calculated for the first vehicle 36 on the basis of the parking duration and deducted from the vehicle owner's account.

A second vehicle 44 is double parked on a street 46. The second vehicle 44 is localised through its transponder 40 according to the method described above, wherein it is determined that the second vehicle 44 is parked on the street 46. The control device in the camera unit 14 then emits an alert signal that informs parking attendants or the police of the double parking.

A third vehicle 48 is also registered as parked, wherein the third vehicle 48 is parked in the third parking bay 26 reserved for the disabled. The registration server 32 checks whether the third vehicle 48 is indicated in the database as a vehicle for a disabled person. If this is not the case, registration server 32 can send a corresponding notification to a parking attendant.

It should be understood that although the transponders 40 in the various vehicles 36, 44, 48 emit the same type of identification signals 42, the identification signals 42 contain different information, wherein, for example, an identification number can be transmitted for each vehicle 36, 44, 48.

FIG. 2 shows a transponder 40 in a schematic side view of a narrow side. The transponder 40 comprises a housing 50 that approximately has the size of a credit card, but has the thickness of two or three commercial credit cards.

The transponder 40 comprises an active transmission and reception unit 52 that is arranged in the housing 50 and that is configured for receiving the request signal 38 and for transmitting the identification signal 42. The transmission and reception unit 52 is supplied with electrical energy from a battery 54.

A passive RFID chip 56 is arranged at a wall in the housing 50. The RFID chip 56 can be activated by externally generated electromagnetic fields. On activation of the RFID chip 56, the RFID chip 56 can transmit an identifier that is e.g. received by an RFID reader (not shown).

LIST OF REFERENCE CHARACTERS

10 System
12 Radio installation
14 Camera unit
16 First camera
18 Second camera
20 Parking area
22 First parking bay
24 Second parking bay
26 Third parking bay
28 First data link
30 Second data link
32 Registration server
14 Database
36 First vehicle
38 Request signal
40 Transponder
42 Identification signal
44 Second vehicle
46 Street
48 Third vehicle
50 Housing
52 Transmission and reception unit
54 Battery
56 RFID chip

The invention claimed is:

1. A method for detecting parked vehicles and for billing parking charges, the method comprising the steps of:
   at least one of recognizing or determining parking bays in a parking area, the parking bays each having an identification;
   arranging a transponder in a vehicle;
   automatically and repeatedly emitting an identification signal by the transponder;
   receiving the identification signal by at least three radio devices placed stationary relative to the transponder and at a distance to one another;
   calculating a position of the vehicle based on the identification signal;
   determining an identification of the transponder using a control device;
   determining the vehicle is situated in one of the parking bays based on the calculated position of the vehicle;
   using the identification signal to determine the vehicle is parked;
   transmitting the identification of the transponder and of the parking bay being used by the vehicle to a registration server;
   calculating a parking charge on the basis of a tariff for the parking bay used by the registration server; and
   initiating a payment procedure by the registration server, wherein, by means of a monitoring system, the parking area is recorded at least partially, wherein the control device is configured to identify vacant and occupied parking bays, and
   wherein, on the basis of the monitoring system, a check is performed to confirm a vehicle identified as being parked by means of the identification signal is parked in the parking bay that was determined, wherein the identification of the transponder and that of the parking bay used by the vehicle are only transmitted to the registration server if the parked vehicle was correctly determined.

2. The method according to claim 1, wherein the vehicle that is stationary for longer than a predetermined period of time is registered as the vehicle that is parked.

3. The method according to claim 1, wherein the identification of the transponder is assigned a vehicle owner by the registration server and the tariff is determined on the basis of personal data of the vehicle owner.

4. The method according to claim 1,
wherein the tariff is also determined on the basis of a time of day, a day of the week and/or a location of the parking bay used.

5. The method according to claim 1,
wherein an amount of credit is assigned to the identification of the transponder from which the parking charge is deducted in the payment procedure.

6. The method according to claim 1,
wherein the transponder emits the identification signal in an encrypted form.

7. The method according to claim 6,
wherein the identification signal is generated by means of an asymmetrical encryption process.

8. The method according to claim 1,
wherein an alert signal is output if a vehicle is parked outside of the parking bays.

9. The method according to claim 1,
wherein an analysis of the occupied and vacant parking bays is performed and data relating to the vacant parking bays is transferred to a parking guidance system.

10. The method according to claim 1,
wherein the control device is configured to identify vacant and occupied parking bays by means of image processing.

11. The method according to claim 10,
wherein the control device is configured to identify vacant and occupied parking bays on the basis of individual images.

12. The method according to claim 1,
wherein the parking area is recorded visually, by means of ultrasound, by means of radar and/or by means of in-ground sensors.

13. The method according to claim 1,
wherein a notification signal is output if the monitoring system detects a vehicle in a parking bay, wherein the position or presence of the vehicle was not detected by means of an identification signal.

14. A system comprising
at least one transponder,
at least three radio devices placed stationary relative to the transponder and at a distance to one another,
a control device and
a registration server connected to the control device by means of a data link,
wherein the system is adapted to execute a method for detecting parked vehicles and for billing parking charges, the method comprising the steps of:
  at least one of recognizing or determining parking bays in a parking area, the parking bays each having an identification;
  arranging the transponder in a vehicle;
  automatically and repeatedly emitting an identification signal by the transponder;
  receiving the identification signal by the at least three radio devices;
  calculating a position of the vehicle based on the identification signal determining an identification of the transponder using the control device;
  determining the vehicle is situated in one of the parking bays;
  using the identification signal to determine the vehicle is parked;
  transmitting the identification of the transponder and of the parking bay being used by the vehicle to a registration server;
  calculating a parking charge on the basis of a tariff for the parking bay used by the registration server; and
  initiating a payment procedure by the registration server,
wherein, by means of a monitoring system, the parking area is recorded at least partially, wherein the control device is configured to identify vacant and occupied parking bays, and
wherein, on the basis of the monitoring system, a check is performed to confirm a vehicle identified as being parked by means of the identification signal is parked in the parking bay that was determined, wherein the identification of the transponder and that of the parking bay used by the vehicle are only transmitted to the registration server if the parked vehicle was correctly determined.

15. The system according to claim 14,
wherein the radio devices are mounted in or at streetlamps, facades, road signs and/or traffic lights.

16. The system according to claim 14,
further comprising a passive RFID chip that is arranged at or in the transponder.

17. The system according to claim 14,
wherein the transponder includes a solar cell that supplies the transponder with power, wherein the transponder is adapted for attachment to the windscreen of a vehicle.

18. The system according to claim 14,
wherein the transponder and the radio devices are adapted for radio communication in the frequency range of 2.4 GHz.

19. The system according to claim 18,
wherein the transponder and the radio devices use at least one of WLAN or Bluetooth.

20. The system according to claim 14,
wherein the identification signals are chirp pulses having a changeable frequency, with the transmission frequency being changed from a start frequency to an end frequency during a pulse.

21. The system according to claim 14,
further comprising a mobile device that is adapted to receive identification signals from the transponder, to transmit an identification of the transponder to the registration server and to receive information from the registration server concerning a vehicle assigned to the transponder.

22. The system according to claim 14,
further comprising a monitoring system for visual recording of at least parts of the parking area, wherein the monitoring system comprises a camera system and a detection unit that is designed to detect vacant and occupied parking bays.

23. The system according to claim 22,
wherein the detection unit includes the control device.

* * * * *